United States Patent
Retze et al.

(10) Patent No.: US 10,201,853 B2
(45) Date of Patent: *Feb. 12, 2019

(54) MULTIPLE COIL ARRANGEMENT FOR A DEVICE FOR GENERATIVE PRODUCTION OF COMPONENTS AND CORRESPONDING PRODUCTION METHOD

(71) Applicant: MTU Aero Engines AG, Munich (DE)

(72) Inventors: Ulrich Retze, Eichenau (DE); Andreas Jakimov, Munich (DE); Herbert Hanrieder, Hohenkammer (DE)

(73) Assignee: MTU Aero Enginges AG, Munich (DE)

( * ) Notice: Subject to any disclaimer, the term of this patent is extended or adjusted under 35 U.S.C. 154(b) by 880 days.

This patent is subject to a terminal disclaimer.

(21) Appl. No.: 14/394,072

(22) PCT Filed: Mar. 28, 2013

(86) PCT No.: PCT/DE2013/000172
§ 371 (c)(1),
(2) Date: Oct. 10, 2014

(87) PCT Pub. No.: WO2013/152751
PCT Pub. Date: Oct. 17, 2013

(65) Prior Publication Data
US 2015/0064050 A1    Mar. 5, 2015

(30) Foreign Application Priority Data
Apr. 13, 2012    (DE) .................. 10 2012 206 122

(51) Int. Cl.
*B22F 3/105*        (2006.01)
*B33Y 50/02*       (2015.01)
(Continued)

(52) U.S. Cl.
CPC .............. *B22F 3/105* (2013.01); *B22F 3/003* (2013.01); *B22F 3/1055* (2013.01);
(Continued)

(58) Field of Classification Search
CPC ........ B22F 3/105; B22F 3/003; B22F 3/1055; B22F 2003/1053; B22F 2003/1056;
(Continued)

(56) References Cited

U.S. PATENT DOCUMENTS 6,905,645 B2 *   6/2005   Iskra ................. B22F 3/1055
                                                                           264/128
2010/0151145 A1   6/2010   Richter et al.
(Continued)

FOREIGN PATENT DOCUMENTS

CN        102 179 517           9/2011
DE        103 35 404             3/2005
(Continued)

OTHER PUBLICATIONS

CN 102179517A—Machine Translation (Year: 2011).*

*Primary Examiner* — Matthew J Daniels
*Assistant Examiner* — Yunju Kim
(74) *Attorney, Agent, or Firm* — Davidson, Davidson & Kappel, LLC

(57) ABSTRACT

A device for additive manufacturing of components by selective irradiation of a powder bed, having a processing chamber—in which at least one powder bed chamber and at least one radiation source are arranged such that the radiation source can irradiate a powder in the powder bed chamber, and wherein the device includes at least one induction coil, so that a component which is produced by irradiation of the powder bed can be at least partially inductively heated, and wherein the induction coil is movable relative to one or more powder bed chambers. A method (Continued)

for additive manufacturing of components by selective irradiation of a powder bed, in which method the component being manufactured is inductively heated at the same time, wherein the position of one or more induction coils for inductive heating is determined and adjusted based on the geometry of the component to be produced.

7 Claims, 2 Drawing Sheets

(51) Int. Cl.
| | |
|---|---|
| *B29C 64/153* | (2017.01) |
| *B23K 35/02* | (2006.01) |
| *B23K 26/60* | (2014.01) |
| *B23K 26/70* | (2014.01) |
| *B23K 26/342* | (2014.01) |
| *B33Y 30/00* | (2015.01) |
| *B23K 26/12* | (2014.01) |
| *B22F 3/00* | (2006.01) |
| *H05B 6/10* | (2006.01) |
| *B23K 26/03* | (2006.01) |
| *B22F 5/04* | (2006.01) |
| *B33Y 10/00* | (2015.01) |

(52) U.S. Cl.
CPC .......... *B23K 26/034* (2013.01); *B23K 26/127* (2013.01); *B23K 26/342* (2015.10); *B23K 26/60* (2015.10); *B23K 26/702* (2015.10); *B23K 35/0244* (2013.01); *B29C 64/153* (2017.08); *B33Y 30/00* (2014.12); *B33Y 50/02* (2014.12); *H05B 6/101* (2013.01); *B22F 5/04* (2013.01); *B22F 2003/1053* (2013.01); *B22F 2003/1056* (2013.01); *B22F 2999/00* (2013.01); *B33Y 10/00* (2014.12); *Y02P 10/295* (2015.11)

(58) Field of Classification Search
CPC ...... B22F 2999/00; B22F 5/04; B23K 26/034; B23K 26/127; B23K 26/342; B23K 26/345; B23K 26/60; B23K 26/702; B23K 35/0244; B29C 64/153; H05B 6/101; B33Y 10/00; B33Y 30/00; Y02P 10/295
USPC ............................................. 425/78; 505/400
See application file for complete search history.

(56) References Cited

U.S. PATENT DOCUMENTS

| | | |
|---|---|---|
| 2012/0018115 A1 | 1/2012 | Hoevel et al. |
| 2012/0213659 A1 | 8/2012 | Bayer et al. |
| 2012/0329659 A1* | 12/2012 | Holcomb .................. B22F 3/00 505/400 |
| 2013/0233846 A1 | 9/2013 | Jakimov et al. |

FOREIGN PATENT DOCUMENTS

| | | |
|---|---|---|
| DE | 10 2006 058 949 | 6/2008 |
| DE | 10 2009 051 479 | 5/2011 |
| DE | 10 2010 050 531 | 3/2012 |
| EP | 2 359 964 | 8/2011 |
| WO | WO 2008/071165 | 6/2008 |

* cited by examiner

MULTIPLE COIL ARRANGEMENT FOR A DEVICE FOR GENERATIVE PRODUCTION OF COMPONENTS AND CORRESPONDING PRODUCTION METHOD

The present invention relates to a method and a device for manufacturing components by an additive manufacturing method, in particular a method using selective irradiation of a powder bed.

BACKGROUND

In the prior art, there are known additive manufacturing methods for the rapid manufacture of prototypes or for the manufacture of components which are difficult to manufacture using other methods. The methods used for this purpose include, inter alia, selective laser melting (SLM), direct metal laser sintering (DMLS), or electron-beam methods. Also known in the prior art are, in particular, additive manufacturing methods for the manufacture of components of a fluid flow machine (e.g., components of an aircraft engine or a gas turbine), such as the method described in DE 10 2009 051 479 A1, and a corresponding device for manufacturing a component of a fluid flow machine.

In this method, such a component is manufactured by layer-by-layer deposition of at least one powder component material onto a component platform in a region of a buildup and joining zone and local layer-by-layer melting or sintering of the component material by energy supplied in the region of the buildup and joining zone. The energy is supplied via laser beams of, for example, $CO_2$ lasers, Nd:YAG lasers, Yb fiber laser, as well as diode lasers, or by electron beams. In the method described in DE 10 2009 051 479 A1, moreover, the component being produced and/or the buildup and joining zone are heated to a temperature slightly below the melting point of the component material using a zone furnace in order to maintain a directionally solidified or monocrystalline crystal structure.

German Patent Application DE 10 2006 058 949 A1 also describes a device and a method for the rapid manufacture and repair of the tips of blades of a gas turbine, in particular of an aircraft engine, where inductive heating is employed together with laser or electron-beam sintering.

Inductive heating of the component to be manufactured is also described in EP 2 359 964 A1 in connection with the additive manufacture of a component by selective laser sintering.

International Patent Application WO 2008/071165 A1, in turn, describes a device and a method for repairing turbine blades of gas turbines by means of powder deposition welding, where a radiation source, such as a laser or an electron beam, is used for deposition welding. At the same time, an induction coil is provided as a heating device for heating the blade to be repaired.

SUMMARY OF THE INVENTION

Thus, in additive manufacturing methods where powder particles are melted or sintered by irradiation to form a component, it is known in the art to additionally provide for heating of the component, and to implement this additional heating by inductive heating. Nevertheless, there are still problems in using such additive manufacturing methods for high-temperature alloys which are not meltable or weldable, because frequently unacceptable hot cracking occurs in such alloys.

It is an object of the present invention to provide a method and a device for additive manufacturing of components that will effectively prevent the formation of cracks during manufacture. At the same time, the device should be simple in design, and the method should be easy to carry out.

The present invention proposes to prevent cracks by local inductive heating in a manner individually adapted to the component geometry to accomplish a required heating of the component in a defined manner. To this end, there is provided a device in which, for inductively heating the component being additively manufactured, at least one induction coil is movable and/or positionable relative to one or more powder bed chambers in which the powder bed for the additive manufacture of the component is provided. The movability of the induction coil relative to the powder bed chamber may be accomplished either by moving the induction coil or by moving the powder bed chamber.

In the context of the present invention, an induction coil is understood to be any device capable of producing inductive heating; i.e., independently of, for example, the number of windings, so that the induction coil may also be referred to as induction loop.

The present invention; i.e., the arrangement of induction coils capable of being moved relative to one or more powder bed chambers, may be employed in various devices and methods for additive manufacturing of components from a powder, such as, for example, in the above-described methods and devices for selective laser melting (SLM), or in direct metal laser sintering (DLS), and in corresponding electron beam methods or in laser powder cladding (LPC). Accordingly, the radiation source of the device for additive manufacturing of components may be any radiation source suitable for this purpose.

The device for additive manufacturing of components may be designed such that the one or more induction coils can be disposed in different positions relative to the powder bed chamber or chambers. These may be defined positions at specific distances from one another, or the induction coil(s) may be adapted to be continuously movable and positionable.

The induction coil may be disposed in any position suitable for effecting inductive heating of the component to be additively manufactured. In particular, any of the induction coils may be disposed above and/or at the side of the powder bed chamber or chambers.

In an embodiment, the induction coil may be movable in a plane, for example, along a rail device or along two rail devices arranged crosswise to each other, so that the induction coil may be disposed in different positions in a plane parallel to a plane of the powder bed chamber in which the powder is bonded by irradiation to form a component. Since in the additive manufacture of components from a powder, the component is formed layer by layer, a suitable position may be selected for the induction coil(s) according to the geometry of the component layer by suitably positioning the induction coil(s) in a plane parallel to the plane in which the layer is deposited. In particular, the component geometry, which varies during the formation process, can be accounted for in the inductive heating. For example, the cross-sectional area of the component may vary (e.g., increase or decrease) considerably in the build-up direction, so that the induction coil(s) may be moved to follow the component geometry, thereby allowing for accurate and precise inductive heating of the component.

In addition, the induction coil(s) may also be designed to be movable in a direction perpendicular to the plane of the powder bed chamber in which the powder is bonded by irradiation to form a component, so that the heating can be controlled via the induction coil by varying the distance from the component to be produced.

As mentioned earlier, only one induction coil may be provided at a powder bed chamber, or a plurality of induction coils may be associated with a powder bed chamber. Since, in addition, a plurality of powder bed chambers may be disposed in a processing chamber, a plurality of induction coils may be used which are positionable relative to various powder bed chambers or a single powder bed chamber. In this connection, the induction coils may be positioned independently of each other. The independent movability of an induction coil is only limited by the potential for collisions of induction coils with each other.

The device for additive manufacturing of components may further include an open- and/or closed-loop control system for controlling the position and/or power of the induction coils in open- and/or closed-loop fashion. Closed-loop control may in particular be performed based on the measurements of a temperature sensing device.

The device described makes it possible in the additive manufacture of a component to individually determine and correspondingly adjust the position of one or more induction coils for inductively heating the component, and to perform such determination and adjustment according to the component geometry to be formed and/or a measured temperature. In addition, the power of the induction coils may be suitably controlled in open- and/or closed-loop fashion, for example, by adjusting the frequency at which the induction coils are operated. This enables accurate and defined temperature adjustment for the component to be additively manufactured, making it possible to prevent the formation of corresponding cracks in components which are to be made from materials that are susceptible to cracking.

BRIEF DESCRIPTION OF THE DRAWINGS

The enclosed drawings show purely schematically in
FIG. 1: a cross-sectional view through a powder bed chamber of a processing chamber of a device according to the present invention; and in
FIG. 2: a plan view of an inventive device having a total of three powder bed chambers for the concurrent manufacture of three components, and two movable coils.

DETAILED DESCRIPTION

Other advantages, characteristics and features of the present invention will become apparent from the following detailed description of an exemplary embodiment, taken in conjunction with the accompanying drawings. However, the present invention is not limited to this exemplary embodiment.

Figure 1:
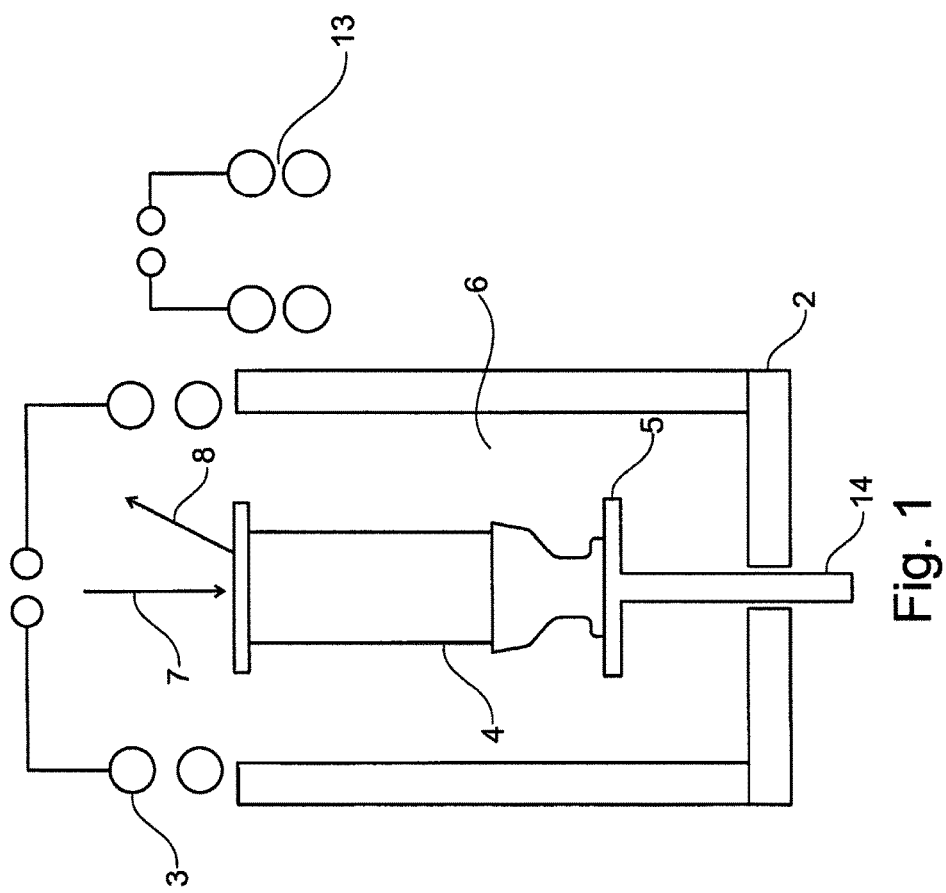

FIG. 1 shows a cross section through a powder bed chamber 2 in which, for example, a single turbine blade 4 is manufactured. Powder bed chamber 2 is essentially configured as a vessel in which a platform 5 is movably disposed above a piston 14. In powder bed chamber 2, powder is provided above platform 5, the platform initially being disposed in the upper region of powder bed chamber 2, so that there a laser beam 7 can melt the powder located on platform 5, so that a corresponding component is formed upon solidification of the melted powder. Turbine blade 4 is manufactured step by step by incrementally lowering platform 5 and providing powder 6 thereabove, as well as melting the powder layer by layer according to the contour to be produced.

In order to prevent cracking or the like during manufacture, the partially manufactured turbine blade 4 is inductively heated in the powder deposition region. To this end, two induction coils 3, 13 are used, which are disposed above and/or at the side of the component or turbine blade.

The preheating temperature is monitored using a pyrometer or a thermal imaging camera capable of sensing thermal radiation 8 and determining the temperature accordingly.

In order to enable accurate control of the temperature profile, the open- and/or closed-loop control of induction coils 3, 13 may be performed using the determined temperature as a controlled variable, such control being performed with respect to the position and/or the power at which the coils are operated. To this end, a corresponding open- or closed-loop control may preferably be provided based on a data processing system having suitable software.

In addition, the positioning of induction coils 3, 13 may be predetermined according to the component geometry to be formed. Since the component geometry may vary during the manufacturing process, the positions of induction coils 3, 13 may also be varied accordingly.

Figure 2:
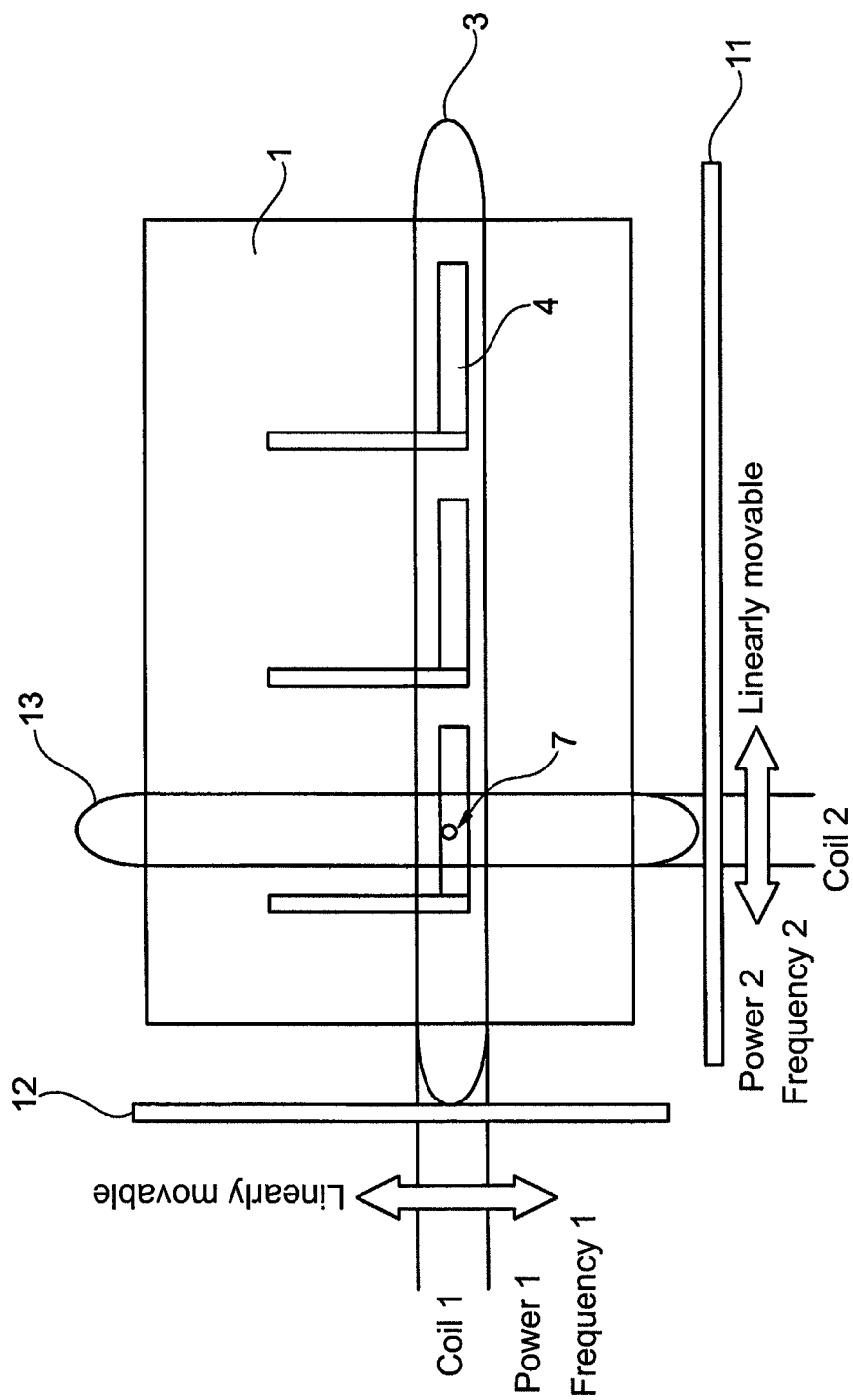

FIG. 2 shows a plan view of an embodiment of a device according to the present invention in which three components 4 can be manufactured concurrently in a processing chamber 1. The respective powder bed chambers are not explicitly shown in FIG. 2.

The device of FIG. 2 includes two coils 3, 13 capable of being moved linearly along rail devices 11, 12. Coils 3, 13 extend along the entire width and length, respectively, of processing chamber 1 and can therefore cover all areas for the manufacture of components 4. Alternatively, it is also conceivable to make coils 3, 13 smaller, so that they cover only a partial area of processing chamber 1. In this case, in addition, linear movability perpendicular to the respective rail devices 11, 12 may be provided instead to be able to position coils 3, 13 at any position of processing chamber 1.

In FIG. 2, laser beam 7, which is directed from above onto the components 4 to be produced, schematically indicates how the laser beam can be moved over processing chamber 1 to produce components 4. In order to prevent laser beam 7 from being blocked, coils 3, 13 may also be moved according to the movement of laser beam 7 and, in particular, be moved out of the range of operation of laser beam 7.

Although the present invention has been described in detail with reference to the exemplary embodiment thereof, those skilled in the art will understand that it is not intended to be limited thereto and that modifications or additions may be made by omitting individual features or by combining features in different ways, without departing from the protective scope of the appended claims. The present invention includes, in particular, any combination of any of the individual features presented herein.

What is claimed is:
1. A device for additive manufacturing of components by laser powder cladding or selective irradiation of a powder bed, the device comprising:
    a processing chamber, at least one stationary powder bed chamber and at least one radiation source being arranged in the processing chamber, such that the radiation source can irradiate a powder in the powder bed chamber; and
    a plurality of induction coils capable of being moved independently of each other relative to the at least one powder bed chamber, and positionable in different positions above or at the side of the at least one powder bed chamber so that a component to be produced by irradiation of the at least one powder bed is at least partially inductively heatable.

2. The device as recited in claim 1 wherein at least one of the induction coils is positionable in different positions in a plane parallel to a plane of the powder bed chamber in which the powder is bonded by irradiation to form the component.

3. The device as recited in claim 1 wherein at least one of the induction coils is adjustable in position in a direction perpendicular to a plane of the powder bed chamber in which the powder is bonded by irradiation to form the component.

4. The device as recited in claim 1 wherein the plurality of induction coils can be disposed relative to a single powder bed chamber of the at least one powder bed chamber.

5. The device as recited in claim 1 further comprising an open- or closed-loop control system or a temperature sensing device, and wherein the position or power of the induction coil are controllable in open-loop fashion or in closed-loop fashion based on the measurements of the temperature sensing device via the open- or closed-loop control system.

6. The device as recited in claim 1, wherein each of the plurality of induction coils extend along an entire width or length of the processing chamber.

7. The device as recited in claim 6, wherein the plurality of induction coils include a first induction coil which extends along the entire width of the processing chamber and a second induction coil, perpendicular to the first induction coil, which extends over the entire length of the processing chamber.

* * * * *